May 31, 1949. S. LOBEL 2,471,530
SYSTEM FOR COMPARING SYNCHRONIZED WAVE SIGNALS
Filed Sept. 12, 1945
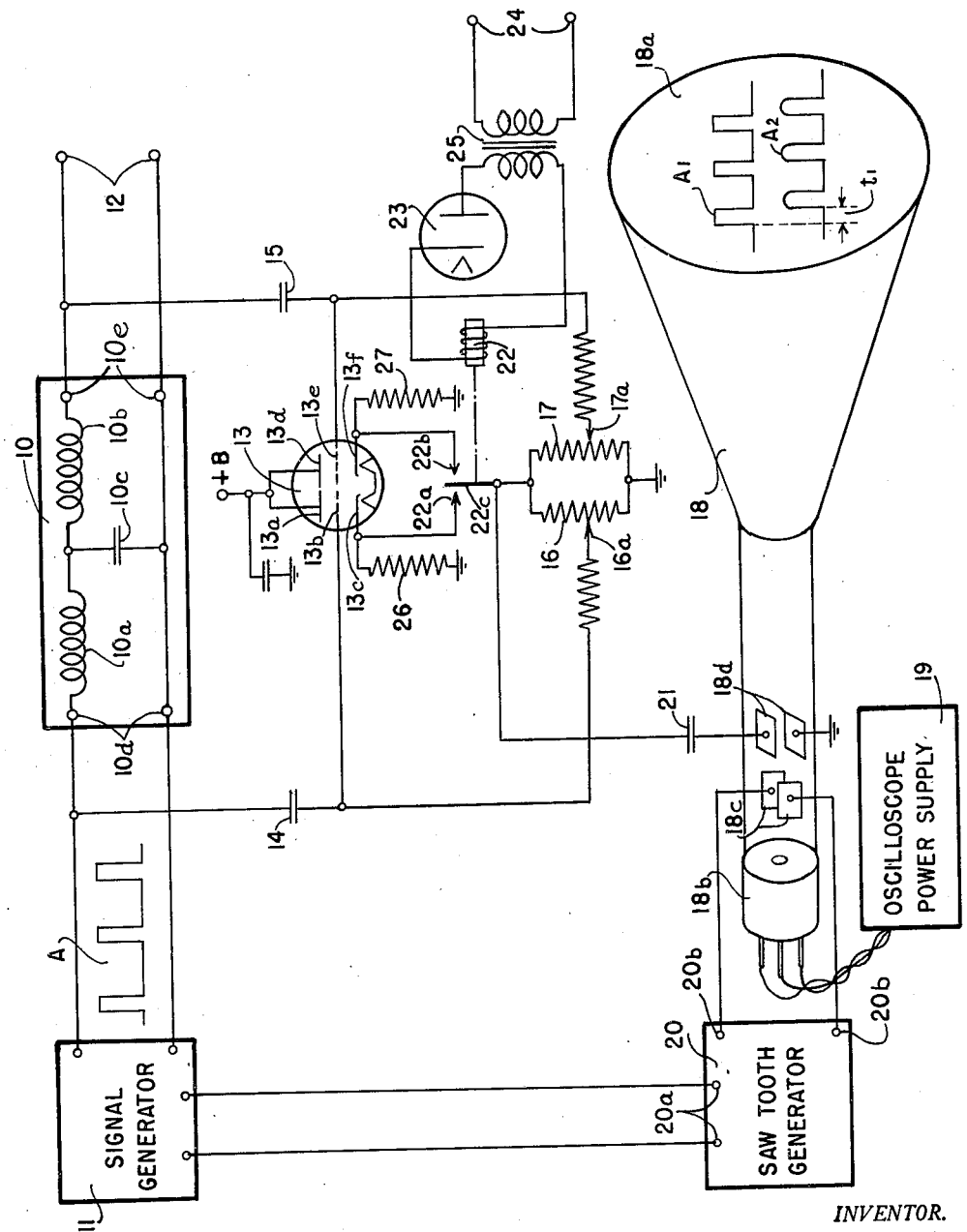
INVENTOR.
SEYMOUR LOBEL
BY Mueller, Dodds & Mason
ATTORNEYS Patented May 31, 1949

2,471,530

UNITED STATES PATENT OFFICE 2,471,530

SYSTEM FOR COMPARING SYNCHRONIZED WAVE SIGNALS

Seymour Lobel, Brooklyn, N. Y., assignor to Air King Products Company, Inc., a corporation of New York Application September 12, 1945, Serial No. 615,895

1 Claim. (Cl. 315—26)

This invention relates to systems for comparing synchronized wave signals and, while it is of general application, it is particularly suitable for comparing the input and output signals of a wave-signal translating apparatus in order to determine distortion, time delay or other translating characteristics of the apparatus.

In the translation of wave signals through any given apparatus, it is frequently desirable to be able to compare directly and continuously the input and output waves in order to determine the translating characteristics of the apparatus, such as amplitude or frequency distortion, time delay, etc. This comparison is particularly important in the case of pulse signals, such as used to a large extent in various types of radio beacons, direction finders and range finders. This is due to the fact that the steepness of the leading and trailing edges of such pulses and the sharpness of their corners are particularly susceptible to distortion or degeneration in wave-signal translating apparatus and to the fact that the precise timing of their leading and trailing edges is of controlling importance in the systems in which they are utilized. Therefore, any time delay introduced by such apparatus must be precisely determined and taken into account in the design and operation of the system of which the apparatus is a part.

It is an object of the invention, therefore, to provide a new and improved system for comparing synchronized wave signals which is particularly useful for comparing the input and output signals of a wave-signal translating apparatus.

It is another object of the invention to provide a new and improved system for comparing synchronized wave signals of the type described which provides a direct and continuous comparison of two related waves by means of which any distortion or time delay, or both, may be readily observed.

In accordance with the invention, a system for comparing two related synchronized wave signals comprises vacuum-tube repeater means having input circuit means and output circuit means and means for individually applying the signals to the input circuit means. The system also includes an oscillographic device, means for scanning the device synchronously with the signals, means for deflecting the beam of the device, and circuit means for coupling the deflecting means to the output circuit means. The system further includes means for periodically rendering the repeater means effective to translate the two signals alternately and means for modifying the excitation of the deflecting means laterally to displace the beam during alternate periods, whereby laterally displaced traces of the signals are developed simultaneously by the oscillographic device.

For a better understanding of the invention, together with other and further objects thereof, reference is had to the following description taken in connection with the accompanying drawings while its scope will be pointed out in the appended claim.

Referring now to the drawing, the single figure is a circuit diagram, partly schematic, of a complete system for comparing the input and output signals of a wave-signal translating apparatus, such as a wave filter.

Referring now to the drawing, there is represented a system for comparing two related synchronized waves, for example the signal input and the signal output of a wave-signal translating apparatus, such as a band-pass wave filter 10 comprising series inductance arms 10a and 10b and a shunt capacitance arm 10c and having input terminals 10d and output terminals 10e. Signals are applied to the input terminals 10d of the apparatus 10 from any suitable source, such as a signal generator 11, while the output signals of the apparatus 10 are derived from terminals 10e and applied to the system output terminals 12 for utilization in any desired manner.

The system also includes vacuum-tube repeater means having input circuit means and output circuit means and means for individually applying the input and output signals of the apparatus 10 to the input circuit means. Specifically, the vacuum-tube repeater means comprises two vacuum-tube repeater paths which may be in the form of separate vaccum-tube repeaters or, as shown, a duplex vacuum-tube repeater 13 in which one repeater path comprises an anode 13a, a control electrode 13b and a cathode 13c and the other repeater path comprises an anode 13d, control electrode 13e and a cathode 13f. The two repeater paths of the tube 13 have individual input circuits, that is their control electrodes 13b and 13e are connected to the input and output terminals 10d and 10e, respectively, of the wave-signal translating apparatus 10 through coupling condensers 14 and 15, respectively. The two repeater paths have a common output or load circuit in the form of a common cathode load resistance means comprising resistors 16 and 17 in parallel and provided with adjustable contacts 16a and 17a, respectively. The input circuits or electrodes of the two repeater paths of tube 13 have biasing means of different values individual thereto which may be derived by connecting the control electrodes 13b and 13e to electrically spaced points on the resistance network 16, 17, for example to the adjustable contacts 16a and 17a, respectively.

The system of the invention also includes an oscillographic device such as an oscilloscope 18 having a fluorescent screen 18a, a base and cathode-ray forming assembly 18b. Suitable operating potentials for the cathode-ray forming assembly 18 may be derived from a power supply unit 19. There are also provided means including a scanning generator synchronized by one of the signals to be compared for scanning the oscilloscope 18 synchronously with the signals. This means may be in the form of a saw-tooth wave generator 20 having input terminals 20a connected to be synchronized by the signal generator 11, as illustrated, and having output terminals 20b connected to a pair of time-base deflecting plates 18c of the oscilloscope 18. There are also provided means for deflecting the beam of the oscilloscope 18 and means for coupling the deflecting means to the output circuit means, that is to the common load resistance network 16, 17 of the repeater means. Specifically, the oscilloscope 18 is provided with a pair of signal-deflecting plates 18d which are coupled across the resistance network 16, 17 through a coupling condenser 21.

The system of the invention also includes means for periodically rendering the repeater means effective to translate the two signals to be compared alternately at a periodicity which is preferably small compared to the persistence of vision of the screen 18a of the oscillographic device and at a frequency which is preferably high compared to the fundamental frequency of the signals. To this end, there is provided an electromagnetic relay 22 and a rectifier tube 23 connected in series and adapted to be excited from commercial alternating-current supply circuit terminals 24 through a transformer 25. The relay 22 is provided with a pair of stationary contacts 22a, 22b and a movable contact 22c with vibrates between the contacts 22a, 22b for connecting the load circuit resistance means 16, 17 alternately in circuit with the two repeater paths of the vacuum tube 13, specifically between the cathodes 13c and 13f and ground, periodically to vary the repeating ratio of the repeating means 13. In order to prevent complete interruption of the repeater paths of the vacuum tube 13 there are provided auxiliary cathode resistors 26 and 27 permanently connected between the cathodes 13c and 13f, respectively, and ground.

In explaining the operation of the comparing system of the invention, it will be assumed that the input signal from the signal generator 11 is in the form of a pulse wave, such as represented by curve A adjacent the generator 11. This signal is applied to the wave filter 10 and, due to the translating properties of this filter, is somewhat distorted or degenerated and simultaneously delayed so that the signal appearing at its output terminals 10e does not exactly correspond in wave form or timing with the input wave. Assuming at the initial instant that the relay 22 is effective to close its contacts 22a, 22c, the input signal to the filter 10 is applied to the control electrode 13b of tube 13 and the repeater path 13a, 13b, 13c of this tube acts in a conventional manner to develop across its cathode load circuit, comprising the resistors 16 and 17 in parallel, a faithful reproduction of the input signal of curve A. This signal is applied through the coupling condenser 21 to the deflecting plates 18d of the oscilloscope 18. Simultaneously, a synchronous saw-tooth wave developed by the generator 20 is applied to the time base deflecting plates 18c and the resultant of these two deflections normal to each other is reproduced on the screen 18a as curve $A_1$, which is a faithful reproduction of the input signal of curve A. The vertical position of curve $A_1$ on the screen 18a is determined by the bias potential applied to the control electrode 13b which, in turn, is controlled by adjustment of contact 16a of cathode-load resistor 16. By suitably adjusting this contact, curve $A_1$ may be made to appear in any desired vertical position on the screen 18a.

An instant of time later, the relay 22 closes its contacts 22b and 22c thereby including the cathode load resistance 16 and 17 in repeater path 13d, 13e and 13f of tube 13 so that this repeater path is effective to reproduce across the cathode load resistance the output signal derived from terminals 10e and impressed on the control electrode 13e through coupling condenser 15. The oscilloscope 18 is then effective to reproduce on the screen 18 curve $A_2$ which is a faithful reproduction of the signal output of the wave filter 10. The vertical position of curve $A_2$ is determined by adjustment of contact 17a of resistor 17. Thus the contacts 16a and 17a may be adjusted to cause curves $A_1$ and $A_2$ to appear vertically displaced at an appropriate distance which may be related to the amplitudes of the signals represented thereby so as to avoid interference of curves $A_1$ and $A_2$. It will be noted that the curve $A_2$ is delayed with respect to the curve $A_1$ by an interval $t_1$ and that the wave form of the curve $A_2$ is distorted or degenerated somewhat with respect to the input curve $A_1$. A comparison of the curves $A_1$ and $A_2$ thus gives a direct indication of the translating properties of the wave filter 10.

In case the terminals 24 are excited with a 60-cycle alternating current, the transformer 25 and rectifier 23 are effective to apply to the relay 22 a 60-cycle pulse wave comprising half-cycles of the supply wave of a given polarity. The relay 22 so excited is effective to vibrate its contact 22c at a frequency of 60 cycles and thus periodically rendering the repeater paths 13a, 13b, 13c and 13d, 13e, 13f alternately effective to translate the input signal at the terminals 10d and the output signal at the terminals 10e. Thus the curves $A_1$ and $A_2$ are alternately traced at a periodicity which is small compared to the persistence of vision of the fluorescent screen 18a so that the curves $A_1$ and $A_2$ appear to persist and may be continuously and directly compared. The system is suitable for comparing signals of a frequency either higher or lower than the frequency of operation of the relay 22. If higher, complete pulse trains will be traced during each interval of operation of one of the repeater paths of the tube 13. If lower, portions of the curves $A_1$ and $A_2$ will be traced alternately. Thus, the system of the invention provides means for directly and continuously comparing two related synchronized signals such as the input and output signals of the wave-translating apparatus.

While there has been described what is at present considered to be the preferred embodiment of the invention, it will be apparent to those skilled in the art that various changes and modi-

I claim:

A system for enabling visual comparison of two related synchronized wave signals comprising, two vacuum-tube repeater paths having individual input circuits and a common cathode load resistance means, said input circuits being returned to electrically spaced points on said resistance means, means for individually applying said signals to said input circuits, an oscillographic device, means for scanning said device synchronously with said signals, means for deflecting the beam of said device, circuit means for coupling said deflecting means to said resistance means, and means for periodically connecting said resistance means alternately in circuit with said repeater paths, whereby laterally displaced traces of said signals are developed simultaneously by said device.

SEYMOUR LOBEL.

REFERENCES CITED

The following references are of record in the file of this patent:

UNITED STATES PATENTS

| Number | Name | Date |
| --- | --- | --- |
| 2,066,522 | Doherty | Jan. 5, 1937 |
| 2,122,499 | Stocker | July 5, 1938 |
| 2,153,140 | Diehl | Apr. 4, 1939 |
| 2,171,216 | Koch | Aug. 29, 1939 |
| 2,221,115 | Shepard, Jr. | Nov. 12, 1940 |
| 2,252,058 | Bond | Aug. 12, 1941 |
| 2,300,999 | Williams | Nov. 3, 1942 |
| 2,376,395 | Skellett | May 22, 1945 |

OTHER REFERENCES

Electronic Industries, September 1944, pp. 84, 85 and 224.